United States Patent
Seri

(10) Patent No.: US 12,141,297 B1
(45) Date of Patent: Nov. 12, 2024

(54) AGENTLESS RUNTIME CYBERSECURITY ANALYSIS

(71) Applicant: Zafran Security LTD, Tel Aviv (IL)

(72) Inventor: Ben Seri, Ramat Gan (IL)

(73) Assignee: Zafran Security LTD, Tel Aviv (IL)

( * ) Notice: Subject to any disclaimer, the term of this patent is extended or adjusted under 35 U.S.C. 154(b) by 11 days.

(21) Appl. No.: 18/436,862

(22) Filed: Feb. 8, 2024

(51) Int. Cl.
*G06F 21/57* (2013.01)
*G06F 21/55* (2013.01)

(52) U.S. Cl.
CPC .......... *G06F 21/577* (2013.01); *G06F 21/554* (2013.01); *G06F 2221/033* (2013.01)

(58) Field of Classification Search
CPC . G06F 21/577; G06F 21/554; G06F 2221/033
See application file for complete search history.

(56) References Cited

U.S. PATENT DOCUMENTS

| | | | |
|---|---|---|---|
| 9,083,734 B1 | 7/2015 | Bishop et al. | |
| 9,178,828 B2 | 11/2015 | Kumar et al. | |
| 9,846,630 B2 | 12/2017 | Kumar | |
| 9,858,154 B1 | 1/2018 | Lyadvinsky et al. | |
| 9,917,855 B1 * | 3/2018 | Li | H04L 63/1408 |
| 10,032,024 B2 | 7/2018 | Dalcher et al. | |
| 10,484,410 B2 | 11/2019 | Fenoglio et al. | |
| 10,678,935 B2 | 6/2020 | Gunda et al. | |
| 10,893,100 B2 | 1/2021 | Jamjoom et al. | |
| 11,132,706 B1 * | 9/2021 | Swinson | G06Q 30/0244 |
| 11,438,374 B2 | 9/2022 | Malkov et al. | |
| 11,522,898 B1 * | 12/2022 | Belton, Jr. | G06N 3/08 |
| 11,580,378 B2 * | 2/2023 | Harmer | G06N 3/084 |
| 11,693,651 B1 * | 7/2023 | Balber | G06F 9/542 |
| | | | 717/120 |
| 11,849,000 B2 | 12/2023 | Williams et al. | |
| 11,868,708 B2 * | 1/2024 | Tsu | G06F 16/382 |
| 2006/0282840 A1 * | 12/2006 | Stone | G06F 9/44552 |
| | | | 719/331 |
| 2010/0313269 A1 * | 12/2010 | Ye | G06F 21/52 |
| | | | 726/23 |
| 2017/0279737 A1 * | 9/2017 | Choe | G06F 9/52 |
| 2017/0359370 A1 * | 12/2017 | Humphries | G06F 21/6218 |
| 2018/0293386 A1 * | 10/2018 | Barouni Ebrahimi | G06F 8/70 |
| 2018/0293394 A1 * | 10/2018 | Gunda | G06F 9/45558 |
| 2019/0018961 A1 * | 1/2019 | Kostyushko | H04L 9/002 |

(Continued)

FOREIGN PATENT DOCUMENTS

KR          101883400 B1       7/2018

*Primary Examiner* — Meng Li
(74) *Attorney, Agent, or Firm* — M&B IP Analysts, LLC

(57) ABSTRACT

Techniques for cybersecurity analysis. A method includes identifying a first set of paths to a first asset. The first set of paths includes a first path which allows for uploading inspection code, a second path which allows for running the inspection code, and a third path which allows for obtaining results of running the inspection code. The first set of paths is selected such that application programming interfaces (APIs) of the first set of paths are at least partially shared with APIs of a second set of paths to each of at least one second asset and, further, selected based on at least one request processing attribute of the at least one API used in order to access the first asset. The inspection code is uploaded via the first path and run via the second path. Outputs of the inspection code are obtained via the third path and analyzed.

26 Claims, 6 Drawing Sheets

(56) References Cited

U.S. PATENT DOCUMENTS

| | | | | |
|---|---|---|---|---|
| 2019/0042713 | A1* | 2/2019 | Porcelli | G06F 21/14 |
| 2019/0058736 | A1* | 2/2019 | Stupak | H04L 63/20 |
| 2019/0180035 | A1* | 6/2019 | Esperer | G06F 21/577 |
| 2019/0180036 | A1* | 6/2019 | Shukla | G06F 9/542 |
| 2019/0205542 | A1* | 7/2019 | Kao | G06F 8/10 |
| 2019/0243964 | A1* | 8/2019 | Shukla | G06F 21/54 |
| 2020/0320202 | A1* | 10/2020 | Farkash | G06N 20/00 |
| 2020/0364360 | A1* | 11/2020 | Solow | G06F 21/604 |
| 2020/0394299 | A1* | 12/2020 | Urias | G06F 21/566 |
| 2021/0073107 | A1* | 3/2021 | Sharma | G06F 21/577 |
| 2021/0099540 | A1* | 4/2021 | Howard | H04L 67/306 |
| 2021/0149854 | A1* | 5/2021 | Barde | H04L 63/126 |
| 2021/0182986 | A1* | 6/2021 | Butler | G06Q 30/0204 |
| 2021/0287107 | A1* | 9/2021 | Badawy | G06N 5/04 |
| 2021/0409440 | A1* | 12/2021 | Barzilay | G06F 16/24 |
| 2022/0100868 | A1* | 3/2022 | Tarrant | G06N 20/00 |
| 2022/0147629 | A1* | 5/2022 | Vasilenko | G06F 21/566 |
| 2022/0147637 | A1* | 5/2022 | Melamed | G06F 21/57 |
| 2022/0247769 | A1 | 8/2022 | Erlingsson et al. | |
| 2022/0329616 | A1 | 10/2022 | O'hearn et al. | |
| 2023/0185922 | A1* | 6/2023 | Sullivan | G06F 16/955 726/25 |
| 2023/0206088 | A1* | 6/2023 | Sastry | G06N 5/04 706/12 |
| 2023/0252136 | A1* | 8/2023 | Kim | G06F 21/566 726/22 |
| 2023/0281483 | A1* | 9/2023 | Mallena | G06N 20/00 706/52 |
| 2023/0306113 | A1* | 9/2023 | Kim | G06F 21/565 |
| 2023/0322266 | A1* | 10/2023 | Dicle | B60W 60/0027 701/26 |
| 2024/0037215 | A1* | 2/2024 | Shimada | G06F 21/51 |
| 2024/0054215 | A1* | 2/2024 | Kim | G06F 21/554 |
| 2024/0106761 | A1* | 3/2024 | Jha | H04L 47/283 |

\* cited by examiner

AGENTLESS RUNTIME CYBERSECURITY ANALYSIS

TECHNICAL FIELD

The present disclosure relates generally to securing assets in computing environment, and more specifically to cybersecurity analysis of computing environments which can be performed at runtime without deploying new agents to the computing environments.

BACKGROUND

Analyses used for cybersecurity may include static analyses which may be performed offline or otherwise when programs are not being executed as well as runtime analyses which are performed while programs are running. Static analyses may include analyzing code, files, or other static portions of data for irregular configurations or other abnormalities that can be detected without observing program behavior. Runtime analyses may be based on how the programs perform when executed.

Performing runtime analysis in computing environments is a challenge, particularly when the entity performing the analysis does not have full authorization or access to components in the computing environments being analyzed. Inability to access relevant data related to communications or other behavior at runtime can therefore lead to less accurate analyses and, consequently, more false positive or false negative detections of anomalous behavior.

To enable access to runtime-relevant data, some existing solutions may utilize agents deployed in computing environments, either deployed in-line between software or other logical components in the computing environments, or otherwise deployed such that data related to communications between logical components in the computing environments may be collected by the agents. This runtime-relevant data may then be analyzed. However, deploying a new agent may require additional cooperation and labor from the operator of the computing environment.

Solutions which avoid certain inefficiencies related to deploying agents as well as solutions which improve accuracy of cybersecurity analysis based on runtime behaviors are therefore desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for cybersecurity analysis. The method comprises: identifying a first set of paths to a first asset, wherein each path of the first set of paths is defined with respect to at least one first application programming interface (API) used in order to access the first asset, the first set of paths including a first path which allows for uploading inspection code, a second path which allows for running the inspection code, and a third path which allows for obtaining results of running the inspection code; wherein the first set of paths is selected such that at least a portion of the at least one first API is shared with at least a portion of at least one second API of a second set of paths to a second asset, wherein the first set of paths is selected based further on at least one request processing attribute of the at least one first API; uploading the inspection code via the first path, wherein the inspection code is configured to analyze runtime behavior with respect to the first asset when executed; running the inspection code via the second path; obtaining results of running the inspection code via the third path, wherein the results of running the inspection code include outputs of the inspection code; and analyzing the results of running the inspection code.

Certain embodiments disclosed herein also include a non-transitory computer readable medium having stored thereon causing a processing circuitry to execute a process, the process comprising: identifying a first set of paths to a first asset, wherein each path of the first set of paths is defined with respect to at least one first application programming interface (API) used in order to access the first asset, the first set of paths including a first path which allows for uploading inspection code, a second path which allows for running the inspection code, and a third path which allows for obtaining results of running the inspection code; wherein the first set of paths is selected such that at least a portion of the at least one first API is shared with at least a portion of at least one second API of a second set of paths to a second asset, wherein the first set of paths is selected based further on at least one request processing attribute of the at least one first API; uploading the inspection code via the first path, wherein the inspection code is configured to analyze runtime behavior with respect to the first asset when executed; running the inspection code via the second path; obtaining results of running the inspection code via the third path, wherein the results of running the inspection code include outputs of the inspection code; and analyzing the results of running the inspection code.

Certain embodiments disclosed herein also include a system for cybersecurity analysis. The system comprises: a processing circuitry; and a memory, the memory containing instructions that, when executed by the processing circuitry, configure the system to: identify a first set of paths to a first asset, wherein each path of the first set of paths is defined with respect to at least one first application programming interface (API) used in order to access the first asset, the first set of paths including a first path which allows for uploading inspection code, a second path which allows for running the inspection code, and a third path which allows for obtaining results of running the inspection code; wherein the first set of paths is selected such that at least a portion of the at least one first API is shared with at least a portion of at least one second API of a second set of paths to a second asset, wherein the first set of paths is selected based further on at least one request processing attribute of the at least one first API; upload the inspection code via the first path, wherein the inspection code is configured to analyze runtime behavior with respect to the first asset when executed; run the inspection code via the second path; obtain results of running the inspection code via the third path, wherein the results of running the inspection code include outputs of the inspection code; and analyze the results of running the inspection code.

Certain embodiments disclosed herein include the method, non-transitory computer readable medium, or system noted above or below, wherein analyzing the results of running the inspection code includes determining at least one path of exploitation of the first asset based on the results of running the inspection code, further including or being configured to perform the following step or steps: determining an exploitability of the first asset based on the at least one path of exploitation of the first asset.

Certain embodiments disclosed herein include the method, non-transitory computer readable medium, or system noted above or below, further including or being configured to perform the following step or steps: correlating instances of the first asset represented in data from a plurality of data sources, wherein the data from the plurality of data sources includes the results of running the inspection code.

Certain embodiments disclosed herein include the method, non-transitory computer readable medium, or system noted above or below, wherein the inspection code includes instructions that, when executed by a processing circuitry, configure the processing circuitry to cause a unique identifier to be attached to the instances of the first asset represented in the data from the plurality of data sources, further including or being configured to perform the following step or steps: identifying the instances of the first asset to be correlated based on the unique identifier as attached to the instances of the first asset represented in the data from the plurality of data sources.

Certain embodiments disclosed herein include the method, non-transitory computer readable medium, or system noted above or below, further including or being configured to perform the following step or steps: determining effects of at least one security control on at least one potential exploitation for the first asset, wherein each security control is configured to perform at least one of detecting vulnerabilities and mitigating vulnerabilities.

Certain embodiments disclosed herein include the method, non-transitory computer readable medium, or system noted above or below, further including or being configured to perform the following step or steps: determining a code flow, wherein the code flow includes use of a first function of a library, wherein the first function is an exported function; identifying a use of the exported function in a memory to which the library is loaded; and correlating the use of the first function to at least one second function based on the determined code flow.

Certain embodiments disclosed herein include the method, non-transitory computer readable medium, or system noted above or below, further including or being configured to perform the following step or steps: identifying at least one value indicating use of the first functions in a global offset tables stored in the memory to which the library is loaded.

Certain embodiments disclosed herein include the method, non-transitory computer readable medium, or system noted above or below, further including or being configured to perform the following step or steps: correlating at least one first library hash among the results of running the inspection code with at least one second library hash, wherein the at least one second library hash corresponds to at least one predetermined library; correlating at least one third library hash with the at least one second library hash, wherein the at least one third library hash is included among outputs of at least one computing environment management tool; and detecting at least one cyber threat based on the outputs of the at least one computing environment management tool and the correlation between the at least one third library hash with the at least one second library hash.

Certain embodiments disclosed herein include the method, non-transitory computer readable medium, or system noted above or below, wherein the at least one second API is configured to access at least one library to be used by the inspection code uploaded via the first path.

Certain embodiments disclosed herein include the method, non-transitory computer readable medium, or system noted above or below, wherein the first set of paths is selected based on a number of actions which can be performed on different assets concurrently via the first set of paths.

Certain embodiments disclosed herein include the method, non-transitory computer readable medium, or system noted above or below, wherein the number of actions which can be performed on different assets concurrently via the first set of paths is defined with respect to at least one of: a limit on concurrent actions for each the at least one first API, speed of at least one system on which the at least one first API is used, and latency of the at least one system on which the at least one first API is used.

Certain embodiments disclosed herein include the method, non-transitory computer readable medium, or system noted above or below, further including or being configured to perform the following step or steps: performing at least one mitigation action based on the results of the analysis.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
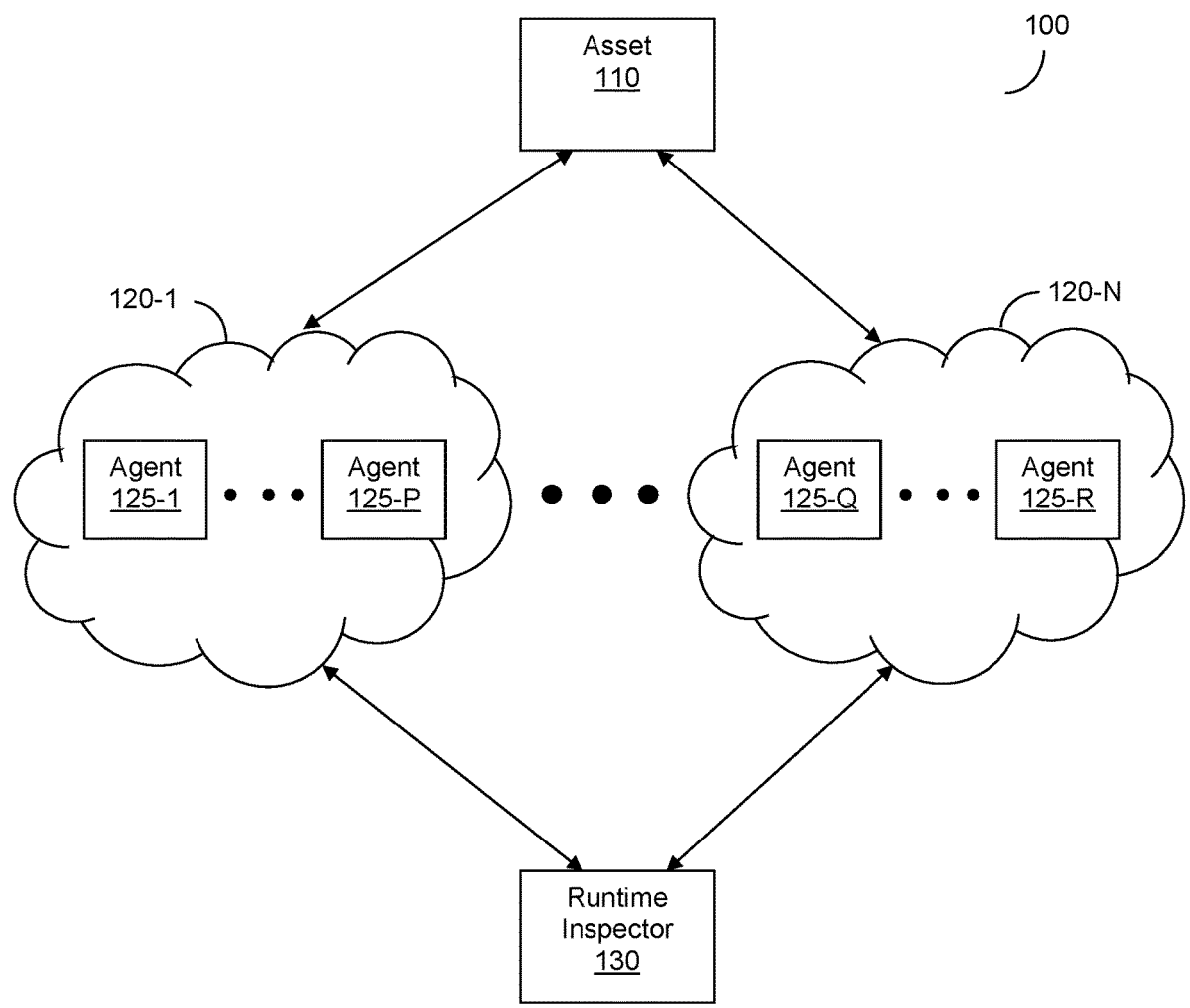
FIG. 1 is a network diagram utilized to describe various disclosed embodiments.

The various disclosed embodiments include methods and systems for runtime analysis which may be utilized to secure computing environments against cyber threats and, more specifically, techniques that enable an agentless runtime analysis which does not requiring deploying an agent to perform the analysis. The disclosed embodiments provide techniques which leverage paths through application programming interfaces (APIs) used by existing agents in order to upload, run, and obtain results of inspection code with respect to an asset. Accordingly, various disclosed embodiments may utilize existing agents that already have access to the asset in order to perform analysis of behavior related to components interacting with the asset at runtime without requiring deploying a new agent to access the asset directly. In this regard, various disclosed embodiments may be utilized in order to effectively enable an "agentless" runtime analysis which does not require deploying a dedicated agent in order to perform runtime inspection and return results of such inspection.

In an embodiment, one or more paths to an asset through existing agents are identified. More specifically, the identified paths at least include a path which allows for uploading inspection code for use in analyzing behavior related to communications with the asset, for running the inspection code or otherwise for causing the inspection code to be run, and for collecting results of the inspection code. Using the identified paths, the inspection code is uploaded and run. Results of the inspection code are collected for subsequent use. The subsequent use may include, but is not limited to, determining paths of potential exploitation of the asset, determining whether the asset is accessible via the Internet, determining whether certain vulnerabilities can be exploited for the asset, and performing mitigation actions to secure the asset (e.g., performing mitigation actions based on vulnerabilities determined to be exploitable for the asset).

Various disclosed embodiments may be realized in an agent-agnostic manner, that is, using agents and their respective APIs of different service providers which utilize those agents. In this regard, it is also noted that these providers often utilize multiple layers of defense for assets accessed by their agents in order to prevent unauthorized third parties from accessing data of the assets. These layers of defense often create situations where results of code being run on hosts for the assets cannot be returned. However, it has been further identified that the results of running code on such hosts may be accessible, albeit via a different path than the path which is utilized to upload and/or run the code. For example, the results of running the code may be output and stored in a location which is not accessible to the agent that uploaded or ran the code. Thus, the disclosed embodiments, which identify a combination of paths that allows for uploading the code, running the code, and obtaining results of the code, allow for obtaining the results of the code even when such results cannot be obtained directly via the same path which was utilized to upload the code.

Various disclosed embodiments further utilize correlation between instances of an asset among different paths in order to verify that the asset for which code is uploaded and run is the same as the asset for which code results are to be collected. To this end, the code uploaded and run with respect to the asset as described herein may include instructions for attaching identifiers to results of the code. The identifiers may be unique identifiers of the asset for which the runtime analysis is to be performed. When the code is run, outputs of running the code will include those attached identifiers such that the asset can be identified as being indicated in the results of running the code.

In this regard, it is noted that different providers (e.g., providers utilizing different agents) may identify assets differently (e.g., using different formats, values, names, etc.) such that a path through one provider's computing environment may identify the asset in one manner, and another path through another provider's computing environment may identify the asset in a different manner. By attaching identifiers to results of running the code, it can be confirmed that a path used for uploading and/or running the code leads to the asset identified in results of the code, thereby verifying that the paths are related to the same asset. This ensures that subsequent processing is performed based on accurate data, i.e., based on data output as a result of running the code with respect to the asset.

To further improve runtime analysis, various disclosed embodiments provide techniques for identifying code flows related to exported functions. More specifically, code flows including exported functions and other (non-exported) functions are identified, which may be utilized to identify certain kinds of vulnerabilities which can be recognized via code flows via exported functions at runtime. For each library being analyzed this way, potential code flows including use of exported functions are determined. The potential code flows may be determined via a static analysis of code among the library. A memory of the library is accessed at runtime. More specifically, the memory may be accessed in order to identify values indicating use of exported functions. Such values may be utilized to identify the exported functions which are used as well as whether the library is used at runtime.

In a further embodiment, the part of the memory accessed in order to identify values indicating use of the exported functions is a global offset table (GOT). Such a GOT maps symbols in programming code to memory addresses at runtime. Entries in a GOT include values that are created when an exported function is utilized such that the presence of these values effectively represents the fact that the exported function was used. Accordingly, in such an embodiment, the GOT table is checked to identify such values with respect to certain exported functions, and these values are identified as the values indicating use of exported functions.

Various disclosed embodiments also provide techniques for performing runtime analysis based on programming languages. More specifically, different runtime analysis processes may be utilized for different programming languages. In this regard, it is noted that certain activities which may be utilized in order to perform runtime analysis may not be possible using certain programming languages, or may be possible but are performed using different software components.

In particular, native languages (i.e., languages which do not need to interpreted in order to run) may have access to an operating system (OS) loader which provides data about which libraries have been loaded into memory, which may therefore be utilized to identify libraries to be analyzed at runtime (for example, in order to identify exported functions of those libraries in order to correlate code flows as discussed above). For non-native languages (i.e., languages which must be interpreted in order to run), other data may be requested (e.g., data indicating which pieces of code are loaded at runtime), and such data may be further analyzed in order to identify which libraries are loaded at runtime.

FIG. 1 shows an example network diagram 100 utilized to describe the various disclosed embodiments. As depicted in the example network diagram 100, an asset 110 is accessible via one or more cloud environments 120-1 through 120-N (hereinafter referred to as a cloud environment 120 or as cloud environments 120), which in turn are accessed by a runtime inspector 130.

To this end, the asset 110 may communicate with the computing environments 120 or components deployed therein such as agents 125 via one or more networks (not shown). Likewise the runtime inspector 130 may communicate with the computing environments 120 or components deployed therein such as agents 125 via one or more networks (also not shown). Such networks may be, but are not limited to, a wireless, cellular or wired network, a local area network (LAN), a wide area network (WAN), a metro area network (MAN), the Internet, the worldwide web (WWW), similar networks, and any combination thereof.

The asset 110 is a computing asset which may be the target of cyber attacks or other cyber threats. To this end, the asset 110 may be or may include, but is not limited to, a system, device, program, code, data store, database, data object, combinations thereof, portions thereof, and the like. Unauthorized access to the asset 110 may allow for cybersecurity issues such as, but not limited to, stealing or otherwise unauthorized access to sensitive data, malicious control over the asset (which, in turn, may allow for improperly accessing other systems and data), both, and the like.

The computing environments 120 may include various components configured to access data, services, and the like, related to the asset 110. In accordance with various disclosed embodiments, one or more computing environments related to the asset 110 are identified such that the identified computing environments collectively allow for uploading code that can be deployed to analyze data related to the asset 110, to run such code, and to obtain data generated using the uploaded code or otherwise affected by the upload code. Thus, in various embodiments, the runtime inspector 130 is configured to identify computing environments among the computing environments 120 that meet these criteria.

In at least some embodiments, the computing environments 120 have agents 125 deployed therein. At least some of the agents 125 are configured to access the asset 110. To this end, the agents 125 may utilize one or more software interfaces such as, but not limited to, application programming interfaces (APIs) in order to communicate with other components of the computing environments 120, with the asset 110, and the like. As discussed herein, the various disclosed embodiments may leverage existing agents deployed in the computing environments 120 such that the agents 125 are not newly deployed for purposes of running and using the runtime inspection code.

The runtime inspector 130 is configured to perform runtime analysis in accordance with various disclosed embodiments. To this end, the runtime inspector is configured to upload runtime inspection code to one or more of the computing environments 120, and to obtain data resulting from execution of the runtime inspection code with respect to the asset 110. The runtime inspector 130 is configured to analyze such data in order to detect potential cyber threats to mitigate.

The runtime inspection code may be uploaded, for example, to the computing environments 120 for execution by the respective agents 125 or otherwise for execution such that the runtime inspection code may utilize one or more of the agents to collect data related to the asset 110 at runtime. As discussed herein, in some embodiments, the runtime inspection code may include instructions for attaching identifiers to results of the runtime inspection code, which in turn may be utilized to uniquely identify the asset 110. When the runtime inspection code including instructions for attaching these identifiers is run with respect to the asset 110, any data generated by any data sources on which the code is run includes an identifier which uniquely identifies the asset 110, thereby allowing for correlating data related to the asset 110 across data sources even if data from those data sources would not otherwise identify the asset 110 using the same identifiers, format, and the like. This, in turn, allows for verifying that different paths to the asset 110 are indeed paths to the same asset.

It should be noted that a single asset 110 is depicted in FIG. 1 merely for simplicity purposes, but that the disclosed embodiments may be equally applied to multiple assets without departing from the scope of the disclosure.

Figure 2:
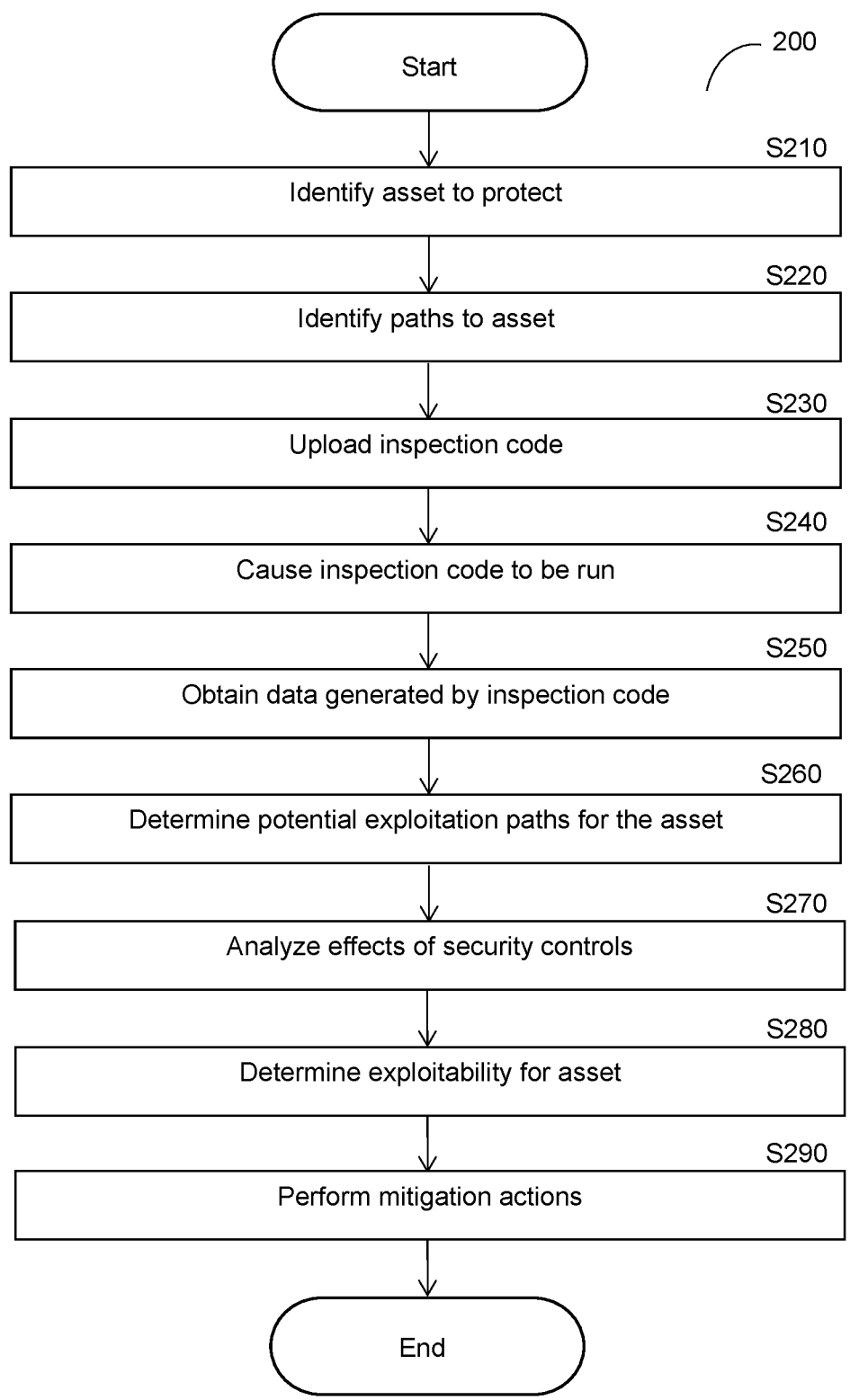
FIG. 2 is a flowchart illustrating a method for performing runtime analysis using paths to assets according to an embodiment.

FIG. 2 is a flowchart illustrating a method 200 for performing runtime analysis using paths to assets according to an embodiment. In an embodiment, the method is performed by the runtime inspector 130, FIG. 1.

At S210, an asset to be protected is identified. The asset to be protected may be indicated, for example but not limited to, in a request, or otherwise may be among a list of assets to be protected. The identified asset may be, but is not limited to, a system, device, program, code, data store, database, data object, combinations thereof, portions thereof, and the like.

At S220, a set of one or more paths to the asset are identified. In an embodiment, the identified paths at least include a path which allows for uploading inspection code for use in analyzing behavior related to communications with the asset, a path which allows for running the inspection code or otherwise for causing the inspection code to be run, and a path which allows for collecting results of the inspection code.

In an embodiment, the identified paths to the asset are paths through interfaces such as, but not limited to, application programming interfaces (APIs). In a further embodiment, the identified paths involve one or more agents. In yet a further embodiment, all agents among the identified paths are existing agents rather than agents deployed specifically to perform the embodiments described herein.

In a further embodiment, the set of paths to the asset is a set of first paths, and the set of first paths is identified such that one or more paths among the set of first paths share one or more APIs in common with one or more paths among a set of second paths used for accessing another asset. More specifically, the set of first paths may be selected in order to maximize or otherwise increase the ability to perform bulk actions via the set of first paths.

Such bulk actions are actions which are performed on multiple assets, for example, actions which are performed on different assets concurrently. For example, assets who are running or interacted with using programs executed using the same operating system may be batched or otherwise grouped together, and actions performed with respect to assets in the same batch or group may be performed concurrently. To this end, factors such as limits on bulk actions (i.e., of concurrently performing actions on different assets) for respective APIs among potential paths are analyzed in order to identify a set of paths that allows for maximizing or otherwise increasing the number of assets which may be acted upon concurrently using APIs. Other factors such as, but not limited to, speed and latency of systems which use APIs among potential paths may also be utilized for identifying the set of paths, for example, by selecting paths with APIs for which actions will have higher average speed and/or lower average latency in order to optimize concurrent actions performed on different assets using the set of paths including those APIs.

In this regard, it is noted that scaling the analyses described herein may involve acting with respect to different assets concurrently rather than running inspection code with respect to different assets in series. This may be particularly relevant when running inspection code for organizations which use many assets (e.g., thousands or millions of assets). Selecting paths in order to optimize concurrent actions among different assets may allow for performing actions in batches with respect to assets which use at least some of the same path. As a non-limiting example, public-facing APIs may be shared among different assets such that most of the set of paths used to access one asset may be shared with a different asset, with only certain internal or otherwise private APIs (i.e., non-public facing APIs in a private computing environment) among that set of paths being different for different assets. Performing bulk actions by uploading code, commands, or both, in bulk via these shared portions of paths therefore allows for performing the inspection analysis more efficiently using less processing power, memory, network resources (e.g., bandwidth), or a combination thereof.

Moreover, scaling these analyses may be needed in some implementations in order to effectively secure environments using the analyses. That is, particularly when running inspection code at runtime as enabled by the disclosed embodiments, pre-mitigating cyber threats is a time sensitive process. Selecting paths in order to optimize concurrency with respect to analyzing different assets therefore also allows for mitigating cyber threats faster.

An example process for identifying paths is described further below with respect to FIG. 3.

At S230, the inspection code is uploaded. More specifically the inspection code is uploaded via one of the identified paths. For example, the inspection code is uploaded via the first path identified as discussed below with respect to S320. As noted herein, the identified paths may include one or more APIs including a first API configured to upload code to a destination location.

In an embodiment, the inspection code is configured to output data generated as a result of one or more runtime inspection analysis processes. In a further embodiment, the outputs include hashes of libraries loaded into memory at runtime. As discussed further below, the library hashes may be utilized to verify identities of libraries in order to improve cyber threat detection and mitigation.

In an embodiment, the inspection code is configured to analyze runtime behavior with respect to common vulnerabilities and exposures (CVEs), common platform enumeration (CPE) identifiers, both, and the like. Such CVEs include predetermined known types of vulnerabilities or exposures which may leave assets vulnerable, and may be defined with information such as triggers for exploiting vulnerabilities of each CVE, criteria for identifying such CVEs, components which may be vulnerable for each CVE, and the like. The CPE identifiers indicate libraries or other components which might be vulnerable to respective CVEs.

At S240, the inspection code is caused to be run. In some embodiments, the inspection code is uploaded along with instructions to execute the inspection code or otherwise with data which causes the inspection code to be run at a destination (e.g., an agent which has access to the asset). More specifically, in an embodiment, causing the inspection code to be run includes sending such instructions for executing the inspection code via a second path including a second API which is configured to cause execution of code at the destination location to which the inspection code was uploaded. The second path may be the same path used to upload the inspection code (i.e., the same as the first path), or along a different path (e.g., a path to a system which controls the agent).

In an embodiment, the second API is an API configured to access one or more existing libraries to be used for executing the inspection code which are deployed, for example, in a computing environment in which the asset is deployed. In other words, the second API may be selected or otherwise determined based on access to any libraries which may be used by the inspection code such that the second API is an API which has access to those libraries.

In this regard, it is noted that some tools are deployed in a specific application whose runtime behaviors are to be analyzed, and that such an application would use certain libraries in order to perform runtime data collection or analysis. Existing solutions could deploy applications with the relevant libraries, but such a deployment is very challenging and may fail. Additionally, to use such custom libraries, the application may need to be rebuilt after the new libraries are deployed. Such rebuilding may be prohibited by or for certain applications. Selecting paths including APIs with access to existing libraries needed for certain functions of the inspection code therefore allows for avoiding such challenges in deploying new custom libraries. Moreover, using APIs and libraries which already exist allows for effectively performing "agentless" runtime inspection which can be realized without deploying a dedicated agent and any accompanying custom libraries.

At S250, data generated at least partially as a result of running the inspection code is collected or otherwise obtained. Such data may include, for example, but not limited to, outputs of the inspection code or data caused to be output by another system or program as a result of running the inspection code. In an embodiment, obtaining the results data includes utilizing a third path including a third API configured to either collect the results data at a location where the outputs of the inspection code are stored, or to generate data based on results of running the inspection code. The third path may be the same as the first path, the second path, both, or neither (i.e., different from both the first path and the second path).

At S260, one or more paths of potential exploitation (also referred to herein as potential exploitation paths) are determined for the asset based on the data generated as a result of running the inspection code. In an embodiment, S260 includes analyzing the data for anomalies or other signs of potential vulnerability based on runtime behavior in order to identify paths via which potential vulnerabilities may be exploited.

In a further embodiment, when an anomaly or other known sign of vulnerability is detected for a library, the paths of potential exploitation may be determined by analyzing exported functions used by that library. To this end, in such an embodiment, uses of exported functions may be identified in-memory for a memory in which the library was loaded at runtime, and code flows involving those exported functions may be analyzed to identify other functions forming a path of potential exploitation via the relevant exported functions. Moreover, in yet a further embodiment, the in-memory data which is analyzed to identify uses of exported functions is or includes a global offset table (GOT).

In this regard, it is noted that a GOT is a table which is built and updated at runtime while a process is loaded and as the process attempts to access exported functions. Consequently, such a GOT appears in-memory at runtime. In many implementations, a GOT includes fields holding values representing exported functions used by the process of the GOT. These fields may be populated as exported functions are used, i.e., by filling a field with a value representing use of a respective exported function each time that exported function is used by the process. Accordingly, it has been identified that such GOTs may be leveraged in order to identify use of exported functions which, when utilized in tandem with the exploitation path analysis discussed herein, allows for connecting use of exported functions to other potentially affected functions in order to unearth new possible signs of cyber threats.

At S270, effects of security controls on the potential vulnerabilities represented by the determined paths are analyzed. The security controls are or include processes configured to detect vulnerabilities, to mitigate vulnerabilities, or both. The security controls may include, but are not limited to, security controls available in computing environments through which the asset is accessible (e.g., computing environments in which agents configured to access the asset are deployed). In an embodiment, the security controls are realized via integrations and, in particular, integrations which allow for accessing or otherwise utilizing cybersecurity tools which may be utilized to detect or mitigate cyber threats. Such integrations may be or may include software or portions thereof such as, but not limited to, subroutines, software modules, programs combinations thereof, and the like, which form or enhance applications. More specifically, the applications may be configured to or may be enhanced to allow the applications to utilize the cybersecurity tools.

In an embodiment, analyzing the effects of the security controls further includes determining which controls are deployed in-line of the potential exploitation paths, determining which functionalities are offered by the controls, types of the controls, combinations thereof, and the like. In a further embodiment, analyzing the effects of the security controls may further include analyzing a mapping which includes connections between security controls, assets which may be vulnerable to exploitations, and other services or systems which access or are accessed by those assets in order to determine where the security controls are deployed relative to the potentially vulnerable assets, certain networks (e.g., the Internet or other public-facing networks), or other services or systems which may affect whether vulnerabilities in the assets are exploitable. As a non-limiting example, such a mapping may demonstrate whether the security control is deployed in-line between an asset and the Internet.

In some embodiments, analyzing the effects of the security controls includes performing a risk analysis with respect to the assets which accounts for effects of the security controls. Such a risk analysis may be based on severities of vulnerable states or potential vulnerable states, reachability of assets to networks, trigger conditions for exploiting vulnerabilities, and how the security controls affect these factors. Example risk analysis techniques which may be utilized in some embodiments is described further in U.S. patent application Ser. No. 18/450,871 filed on Aug. 16, 2023, assigned to the common assignee, the contents of which are hereby incorporated by reference.

At S280, an exploitability of the asset is determined based on the potential exploitation paths and any effects of the security controls on the potential exploitations. In an embodiment, determining the exploitability includes determining a likelihood of exploiting each of one or more potential vulnerabilities via the potential exploitation paths.

In a further embodiment, determining the exploitability may include determining whether an asset is Internet-facing or otherwise public network-facing. To this end, in such an embodiment, the inspection code may be configured to analyze log files and network events involving the asset in order to identify predetermined fingerprints of network events which are known to relate to Internet traffic, and determining the exploitability may include identifying whether any of the potential exploitation paths are to the Internet or another public-facing network based on the fingerprints identified by the inspection code. As a non-limiting example for using fingerprints related to an asset using a replication feature, access logs of web applications using the replication feature may be analyzed in order to identify fingerprints indicating hypertext transfer protocol (HTTP) connections, and any web applications for which such fingerprints are found may be determined as having an inbound connection to the Internet.

As a non-limiting example for determining exploitability, based on the potential exploitation paths, it is determined whether a potential exploitation path for a particular vulnerability from the asset leads to the Internet and whether any security controls are deployed in-line between the asset and the Internet. If a potential exploitation path for that asset leads to the Internet and no security controls which would be capable of stopping or mitigating exploitation of that vulnerability are deployed in-line between the asset and the Internet, then it is determined that the vulnerability is exploitable for that asset pursuant to determining the exploitability of the asset.

As another non-limiting example for determining exploitability of a vulnerability in a certain library which is network-triggered, i.e., which is capable of being exploited if a process with this vulnerability can reach a network. For such a vulnerability, determining exploitability may include determining, based on results of running the inspection code, whether a process having this vulnerability has any inbound or outbound connections to external systems (which could possibly have access to external networks). If the process having this vulnerability does not have any such connections to external systems, it is determined that the vulnerability is not exploitable for this process, for an asset which uses this process, or both. If the process having this vulnerability has such a connection, it may be determined that the process is potentially exploitable with respect to this vulnerability.

As yet another example for determining exploitability of a vulnerability which is related to a certain library (i.e., such that the vulnerability is exploited while the library is in use), the exploitability determination may include determining whether that library is in use. As a further example, whether the library is in use may be based on results of the inspection code indicating values found in a GOT table corresponding to that library. More specifically, having one or more values representing use of exported functions of the library may be used to determine that the library is in use, which in turn may be utilized to determine whether a process using that library is potentially exploitable. In other words, if the GOT table for the library includes one or more values indicating use of exported functions of the library, then it is determined that the library is in use for the process and is therefore capable of being exploited.

In some embodiments, determining exploitability may first include determining whether a vulnerability is potentially exploitable (e.g., based on paths of exploitation such as depending on whether the vulnerable asset has a path to the Internet as a prerequisite for exploitation), and then only determining further aspects of exploitability (e.g., full risk analysis, degree of potential harm, effects of controls, etc.) when it is determined that the vulnerability is potentially exploitable. This may allow for conserving computing resources related to performing a full exploitability analysis by only performing the full analysis when the path-based or other initial analysis yields a result that a vulnerability is capable of being exploited.

At S290, one or more mitigation actions are performed based on the exploitability of the asset. The mitigation actions may include, but are not limited to, deploying or utilizing security controls in order to cause one or more cybersecurity tools to act with respect to the asset. The mitigation actions to be performed may be determined based on a type of vulnerability which may be exploited for the asset (e.g., a type of CVE indicated in results of running the inspection code).

Figure 3:
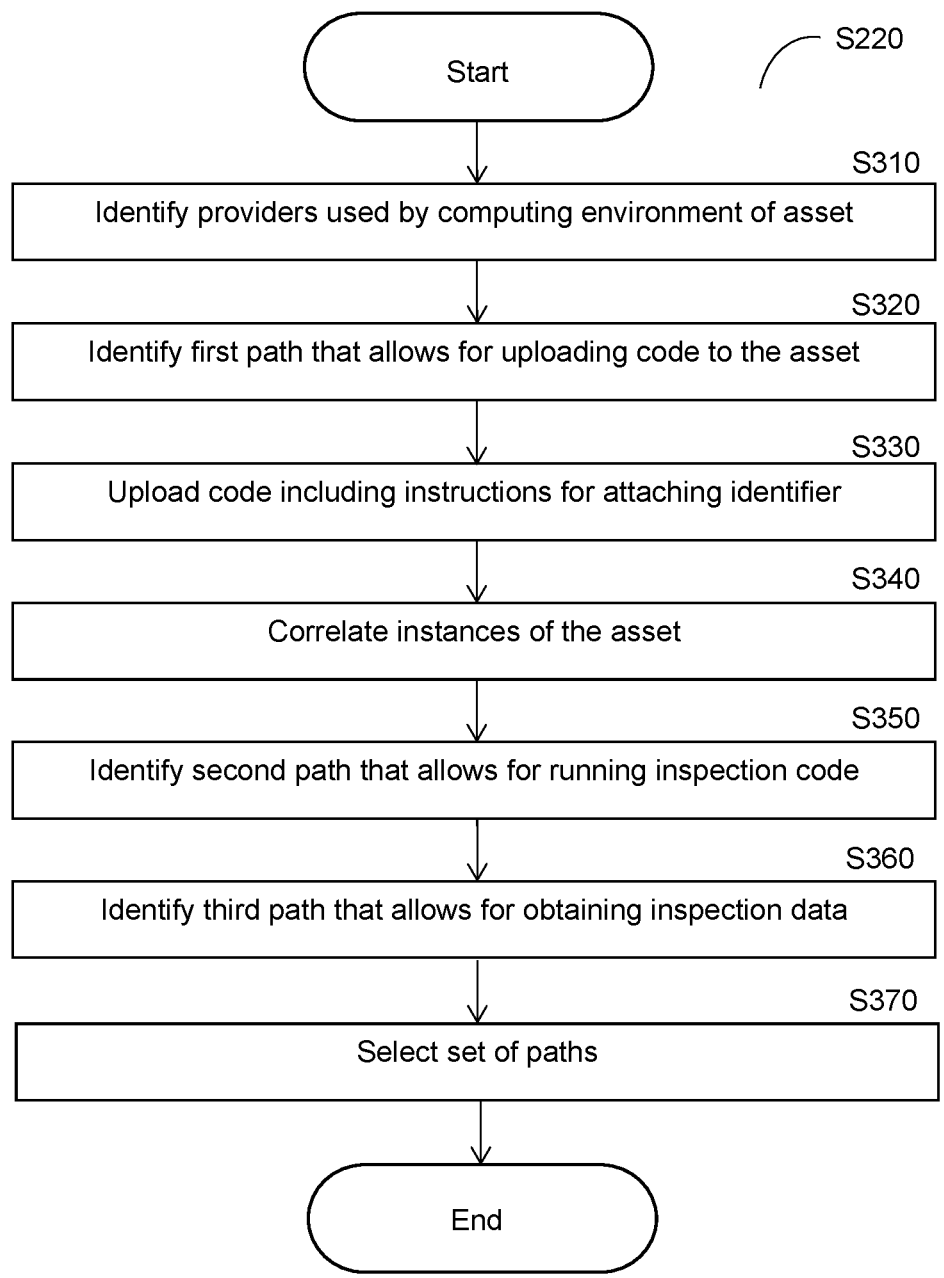
FIG. 3 is a flowchart illustrating a method for identifying paths to an asset according to an embodiment.

FIG. 3 is a flowchart S220 illustrating a method for identifying paths to an asset according to an embodiment.

At S310, providers of services used by a computing environment of an asset are identified. The providers of services may include, but are not limited to, providers of services utilizing application programming interfaces (APIs) in order to deliver services involving accessing the computing environment. These providers may be identified based on integrations or other communication channels with the computing environment of the asset.

At S320, one or more first paths which allow for uploading code for execution by or with respect to the asset is identified. In an embodiment, each first path is a path including one or more first APIs which are configured to upload code to a computing environment in which the asset is deployed or otherwise in which the asset is accessible. To this end, in a further embodiment, identifying the first paths further includes identifying the first API which is configured to upload the code with respect to the asset. The identified first paths may serve as potential first paths which may be selected for inclusion in a set of paths used for inspection analysis as described further below with respect to S370.

At S330, code including instructions for attaching a unique identifier to instances of the asset represented in data is uploaded via the first API. The unique identifier is uniquely assigned to the asset, i.e., such that the unique identifier is only attached to data representing that asset and not to data representing other assets. Consequently, instances of the unique identifier may be identified in different data (e.g., data from different providers or otherwise from different data sources) in order to uniquely identify the asset regardless of how the asset is identified in different data sources (e.g., via different formats, identifiers, combinations thereof, and the like). As a non-limiting example, the unique identifier "asset_uid_267" may be attached to instances of data representing the asset including one portion of data identifying the asset as "data_store_5" and another portion of data identifying the asset as "credit_card_inventory."

Utilizing code uploaded as described herein to attach unique identifiers may allow for more efficiently deduplicating data later. That is, different data sets including data identifying assets may be correlated with respect to the unique identifier, thereby allowing for identifying the asset in different data without requiring more extensive analysis. Accordingly, data to be processed for analyzing exploitability with respect to a particular asset may be condensed to only include portions of data including the unique identifier assigned to that asset or otherwise corresponding to such portions of data.

At S340, instances of the asset are correlated based on the instances of the unique identifier attached to the respective instances of the asset. In other words, when the code uploaded via the first API is executed, the code causes data indicating the asset to be attached to the unique identifier. As noted above, by identifying instances of the unique identifier among data, the asset can be identified even among data in which the asset is represented in different formats, using different identifiers, both, and the like. In the example noted above, both the identifier "data_store_5" and the identifier "credit_card_inventory" may be attached to the unique identifier "asset_uid_267" such that identifying "asset_uid_267" allows for correlating the data using the identifiers "data_store_5" and "credit_card_inventory."

At S350, one or more second paths which allow for running the inspection code is identified. In an embodiment, each second path includes one or more second APIs which are configured to run code which has been uploaded to a certain location (i.e., a location to which the code is uploaded via the first path). In some implementations, a given second path is the same as one of the first paths. The identified second paths may serve as potential second paths which may be selected for inclusion in a set of paths used for inspection analysis as described further below with respect to S370.

At S360, one or more third paths which allow for obtaining inspection data which is or includes results of running the inspection code, i.e., data which is created at least partially as a direct or indirect result of running the inspection code. For example, such data may include data created directly by running the inspection code, e.g., as an output of the inspection code. As another example, such data may include data created indirectly by running the inspection code, e.g., data created by another system or program which was triggered by running the inspection code or otherwise caused to be generated by that system or program due to running of the inspection code.

In an embodiment, each third path is a path to a data store or other location in which data indicating results of running the inspection code may be stored and collected. As a non-limiting example, where the inspection code is uploaded and run so as to generate outputs to be stored in a certain data store, a given third path is a path to that data store which allows for retrieving data from that data store. In another embodiment, each third path may be a path including an API which is configured to generate or otherwise collect the results of running the inspection code. The identified third paths may serve as potential third paths which may be selected for inclusion in a set of paths used for inspection analysis as described further below with respect to S370.

In this regard, it is noted that some agents use APIs to upload and run scripts or other code packages, but that the APIs used to upload and run these scripts do not enable collection of the data resulting from running these code packages. It is also noted that the code packages may produce outputs, and may store the outputs in a different location which may be accessible via a path made up of a different set of APIs, or may produce certain outputs in response to requests (e.g., from other APIs). The disclosed embodiments utilize a set of paths including one or more paths which collectively enable uploading, running, and collecting results of running the inspection code in order to facilitate runtime analysis as discussed herein.

At S370, a set of paths is selected based on the identified first, second, and third paths. In an embodiment, the set of paths includes one of the identified first paths, one of the identified second paths, and one of the identified third paths. In a further embodiment, the set of paths may be further selected so as to optimize bulk processing of actions performed with respect to different assets. To this end, a first set of paths may be selected such that one or more of the first path, the second path, and the third path among that set of paths shares one or more APIs in common with a respective path of one or more second sets of paths to another asset. In other words, the first set of paths is selected such that there is some overlap in APIs used among its paths with APIs of paths among the second sets of paths.

In a further embodiment, the set of paths is identified based further on one or more factors related to performing bulk actions. Such factors may include request processing attributes such as, but not limited to, limits on concurrent or otherwise bulk actions for respective APIs among potential paths, speeds of systems using APIs along potential paths, latencies of systems using APIs along potential paths, combinations thereof, and the like.

In this regard, it is noted that actions may be performed with respect to the asset concurrently with performing actions on other assets in accordance with various disclosed embodiments. For example, assets may be processed in batches (e.g., batches with respect to operating systems of systems using respective APIs), with concurrent actions being performed with respect to assets in the same batch.

Further, it has been identified that limits on bulk or otherwise concurrent actions set for respective APIs affects optimization of performing such concurrent actions. Limits of APIs that prevent bulk processing (or prevent a certain threshold number of concurrent actions), either explicitly defined limitations or limitations in computing or networking resources, will consequently the ability to upload and run inspection code with respect to different assets in batches. Thus, selecting the set of paths based on factors related to bulk actions in the form of explicitly defined limitations or hardware limitations allows for maximizing or otherwise optimizing the number of assets that can be analyzed concurrently.

Figure 4:
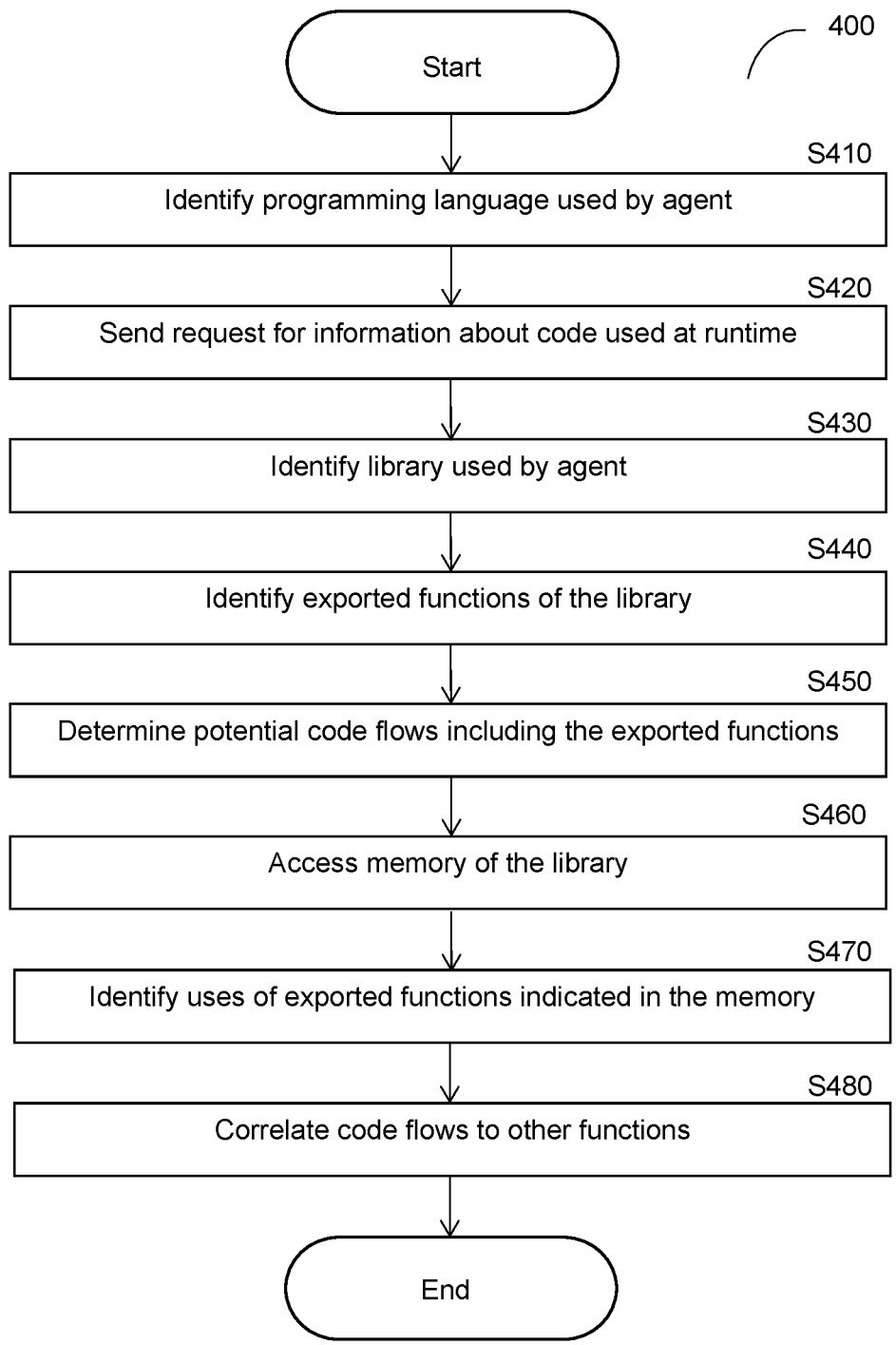
FIG. 4 is a flowchart illustrating a method for analyzing code flows according to an embodiment.

FIG. 4 is a flowchart 400 illustrating a method for analyzing code flows according to an embodiment. In an embodiment, the method is performed by the runtime inspector 130, FIG. 1.

At S410, a programming language used by an agent (e.g., an agent configured to access a particular asset to be protected such as an asset as discussed above with respect to FIG. 2) is identified.

In an embodiment, identifying the programming language used by the agent includes applying one or more programming language identification rules defined with respect to potential characteristics of code run by the agent such as, but not limited to, file name, keyword search (e.g., for keywords of certain known functions which are unique to certain programming languages or for keywords indicating a known name of the programming language), and the like. In a further embodiment, the programming language identification rules are applied in order to analyze data such as, but not limited to, the code which is to be executed by the agent, files used by the agent, files in the same folder as code to be executed by the agent, combinations thereof, and the like.

In some embodiments, the identified programming language is used to select or otherwise determine runtime analysis techniques or processes to be utilized during subsequent processing.

When the identified programming language is a native language which does not need to be interpreted in order to run on a given system, subsequent runtime analysis may include accessing an operating system (OS) loader in order to obtain data about which libraries have been loaded into memory. More specifically, the OS loader may be queried in order to obtain data indicating which libraries have been loaded into memory, the location of a global offset label, both, and the like.

When the identified programming language is a nonnative language, subsequent runtime analysis may include obtaining data which may be indicative of libraries that would be loaded into memory (e.g., data indicating pieces of code which are loaded at runtime that may utilize certain libraries) and analyzing that data in order to determine which libraries have been loaded into memory. As a non-limiting example for a native language executed using a virtual machine (VM) for that language such as Java VM for Java, such data may be obtained by querying Java VM for data indicating which pieces of code have been loaded at runtime.

As another non-limiting example, a system may be queried for data describing the libraries which have been loaded into memory.

In this regard, it is noted that different runtime analysis processes may be utilized for different programming languages. That is, such processes may be designed differently in terms of formatting, variables, use of functions, and other characteristics that may vary between programming languages.

It is also noted that native languages may provide access to tools which can facilitate identifying libraries in memory, which in turn may reduce processing of data related to analyzing the data to find references to the libraries or other indicators of those libraries being loaded into memory. Accordingly, by determining whether the language used by the agent is a native language for a system on which the agent is deployed or a nonnative language for that system, it may effectively be determined whether further analysis of data may be skipped in favor of using a tool such as an operator loader in order to determine libraries loaded into memory. Consequently, identifying when native tools are available to leverage may allow for reducing computing resources and identifying libraries in memory more efficiently.

At S420, a request for data related to code used by the agent at runtime is sent. The request may be or may include, but is not limited to, a request for data from an operating system loader explicitly indicating libraries loaded into memory as a result of code used by the agent at runtime, a request for data indicating which portions of code have been loaded and therefore used by the agent at runtime, and the like. As noted above, the request may be a request for data from an operating system loader when the programming language of the agent is a native programming language for the system on which the agent is deployed.

At S430, a library used by the agent is identified. In an embodiment, identifying the library includes analyzing the requested data in order to identify a library loaded into memory via code being run by the agent at runtime.

As noted above, when the analysis varies based on programming language, the library may be identified using a different process depending on whether the programming language of the agent used with respect to libraries is a native language (i.e., a language which does not need to be interpreted by the agent before running) or a nonnative language (i.e., a language which is interpreted by an interpreter before running). When the language is a native language, identifying the library may include querying an operating system loader of the native language in order to obtain data about libraries which have been loaded into memory from which the library may be identified. When the language is a nonnative language, identifying the library may include requesting data indicating which pieces of code are loaded at runtime and analyzing the data in order to identify the library among the pieces of code loaded at runtime.

At S440, exported functions of the library used by the agent are identified. The exported functions are a set of functions included among a list of the library which are defined in other modules (i.e., modules outside of the library). During execution of code using a library with exported functions, the modules defining the exported functions are called in order to access those exported functions. In an embodiment, identifying the exported functions of the library includes analyzing data in the library. In a further embodiment, identifying the exported functions includes applying one or more exported function identification rules defined with respect to predetermined characteristics of known exported functions (e.g., known exported function names) or otherwise with respect to predetermined characteristics known to be possessed by exported functions.

At S450, potential code flows including the identified exported functions are determined. In an embodiment, determining the potential code flows includes analyzing code among the library. This analysis may be a static analysis performed offline (i.e., not during runtime). More specifically, the code among the library may be analyzed in order to at least identify portions of code (e.g., non-exported functions, subroutines, etc.) which call or are called by the exported functions. The analysis may proceed outward in order to further identify sequences of portions of code called such that each code flow is a sequence of calls between portions of code including at least one call to one of the exported functions, at least one call by one of the exported functions, or both.

At S460, a memory of the library is accessed. More specifically, the memory is accessed in order to obtain or otherwise access data which may indicate or otherwise relate to the exported functions.

At S470, uses of the exported functions indicated in the memory are identified. In an embodiment, identifying the exported functions used by the library includes identifying predetermined values indicating use of exported functions (e.g., predetermined values known to be indicators that respective exported functions have been used) in the accessed memory. Such predetermined values may therefore be utilized to identify both use of the exported functions as well as whether the library itself is used at runtime.

In a further embodiment, identifying the uses of the exported functions includes accessing a global offset table (GOT) included in a portion of the memory into which the library is loaded. Such a GOT maps symbols in programming code to memory addresses at runtime. Entries in a GOT include values that are created when an exported function is utilized such that the presence of these values demonstrate which exported functions were used. Accordingly, in an embodiment, identifying the exported functions used by the agent includes analyzing the GOT in order to identify certain predetermined values corresponding to uses of respective exported functions, where the exported functions used by the agent are identified as the exported functions corresponding to the predetermined values identified within the GOT table.

At S480, code flows involving the identified uses of the exported functions are correlated to other functions such as non-exported functions of the library. More specifically, as noted above, the code flows may include calls between functions including calls to or from the exported functions as well as other functions (e.g., non-exported functions).

By identifying use of a given exported function, an applicable code flow determined as discussed above which involves the exported function (i.e., includes a call to the exported function, a call by the exported function, or both) may be identified, and other functions among that code flow may be correlated to the respective use of the exported function. In other words, an exported function which was used can be used to identify the code flow which includes that exported function and one or more other functions. Then, the other functions of that code flow can be correlated to the use of the exported function.

Moreover, in some implementations, an exported function may be included in more than one of the potential code flows. In such implementations, correlating the use of the exported function to other functions may further include identifying which of the potential code flows including the exported function applies to the instant use of the exported function. In a further embodiment, data in the memory of the library may be analyzed in order to identify other functions calling or called by the exported function in question, and a sequence of calls between functions may be matched to one of the potential code flows (e.g., based on partial or full matching of the sequence represented by the potential code flow).

The other functions which were correlated to the code flows including the used exported functions may be utilized for purposes of identifying potential cyber threats as described herein which, in turn, allows for improving mitigation of those cyber threats. For example, when a library is determined to include a vulnerability, other (non-exported) functions among the same code flows as exported functions used by the memory may be identified as potential exploitation paths (which may also be referred to as potential paths of exploitation). These potential exploitation paths may be analyzed in order to determine whether mitigation actions are to be performed or otherwise whether the potential exploitation paths are actually susceptible to exploitation (e.g., a potential path of exploitation which leads to the Internet or other public-facing network may be determined to be susceptible to exploitation as part of determining an exploitability of that potential path of exploitation).

Figure 5:
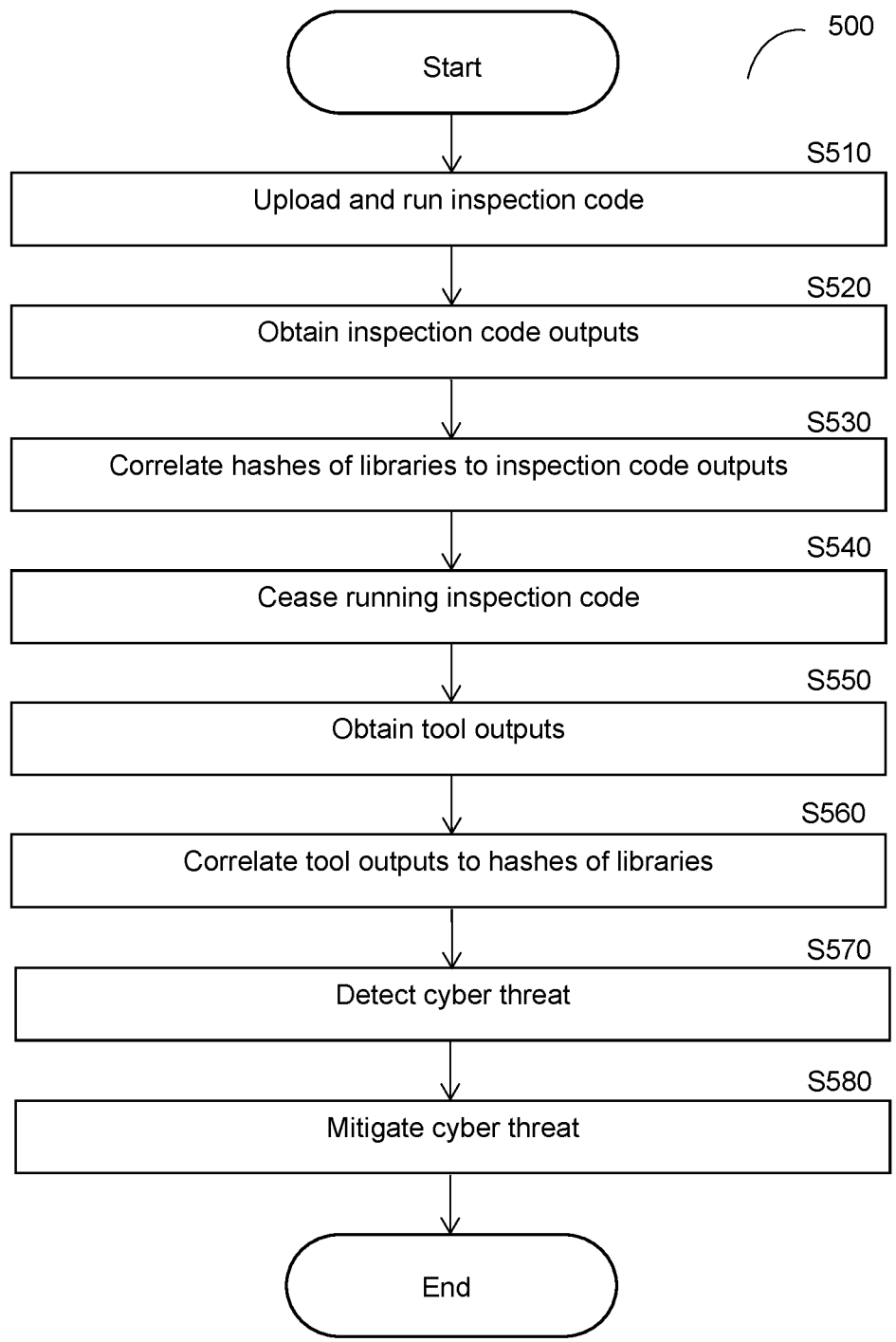
FIG. 5 is a flowchart illustrating a method for mitigating cyber threats using runtime library hash correlation according to an embodiment.

FIG. 5 is a flowchart 500 illustrating a method for mitigating cyber threats using runtime library hash correlation according to an embodiment. In an embodiment, the method is performed by the runtime inspector 130, FIG. 1.

At S510, inspection code is uploaded and run. In an embodiment, the inspection code which is uploaded and run is configured to output hashes of libraries loaded into memory at runtime while the inspection code is being run. More specifically, the inspection code is configured to generate and output hashes of libraries loaded into a memory used by an agent configured to access an asset to be protected or otherwise by a system to which the inspection code is uploaded. The library hashes output by the inspection code may subsequently be utilized to verify hashes output by other systems as discussed further below. In a further embodiment, the inspection code is uploaded using first and second paths, respectively, for example as discussed above with respect to FIG. 2.

At S520, outputs of the inspection code are obtained. More specifically, the outputs are outputs of inspection analyses or other analyses performed by the inspection code at runtime while the inspection code is being run. As noted above, the outputs at least include hashes of libraries loaded into memory. In an embodiment, the outputs of the inspection code are obtained using a third path, for example, a third path as discussed above with respect to FIG. 2.

At S530, known hashes of libraries are correlated to the outputs of the inspection code. The known hashes of libraries may be or may include, but are not limited to, hashes of libraries included among a dictionary of known libraries. The correlation may be performed in order to match hashes and identify which hashes output by the inspection code belong to which of the known libraries.

As noted above, the hashes of libraries output by the inspection code may be utilized to verify that hashes belong to particular libraries. While the inspection code is running after being uploaded to a system having relevant access with respect to an asset, the inspection code effectively has access to better information than an external system. Accordingly, correlating hashes output by the inspection code while the inspection code is being run in such a manner allows for verifying that the hashes of known libraries actually match the libraries which are used (i.e., loaded into memory) at runtime such that later, when the inspection code is not being run, hashes output by other tools may be verified as belonging to certain known libraries more accurately, thereby improving accuracy of subsequent processing (e.g., detecting and mitigating potential cyber threats).

At S540, running of the inspection code is ceased. The inspection code may run until a predetermined period of time has passed or otherwise until one or more predetermined criteria are met. To this end, in at least some implementations, the inspection code is caused to be ceased by instructions in the code as uploaded defining such criteria and that, when executed by a processor, configure the processor to cease when such criteria are met.

At S550, outputs of one or more tools are obtained. The obtained outputs include outputs which may indicate libraries used at runtime in the form of library hashes. The tools may include cybersecurity or other computing environment management tools which output data that may be indicative of potential cyber threats and may include, but are not limited to, antivirus tools, endpoint protection platform (EPP) tools, and the like. Such tools may output hashes of libraries exhibiting potentially malicious behavior or being utilized by services or systems exhibiting potentially malicious behavior. To this end, the tools may be configured to detect anomalous, prohibited, or other predetermined kinds of potentially malicious behavior, and to output data indicating services, systems, libraries, and the like, related to the potentially malicious behavior.

At S560, the outputs of the tools are correlated to the hashes of the known libraries which were matched to hashes output by the inspection code at runtime. As noted above, because the hashes of the known libraries were matched to hashes output by the inspection code at runtime, the hashes were effectively verified as being the actual hashes of those libraries. Accordingly, correlating the outputs of the tools to these hashes allows for accurately identifying which libraries are involved in potential cyber threats. In other words, this correlation allows for verifying that hashes output by the tools are not false positives.

In this regard, it is noted that hashes of libraries can be used to identify libraries involved in cyber attacks, but that using hashes carries a risk of false positives identifying certain libraries which were not actually involved in potentially malicious behavior. In other words, a given library may be falsely identified as being loaded into memory of a system exhibiting abnormal or otherwise potentially malicious behavior. Inaccurately identifying that a particular library has been loaded into memory may cause issues such as, but not limited to, inaccurate detection of potential cyber threats, inaccurate identification of root causes, applying mitigation actions with respect to incorrect systems or services, and the like.

At S570, a cyber threat is detected based on the outputs of the tools. Moreover, the cyber threat is detected with respect to one or more libraries identified based on the correlation between the outputs of the tools and the hashes of the known libraries. To this end, the cyber threat may be detected based on libraries affected as identified based on the correlation in combination with abnormal behaviors. For example, such a combination of affected libraries and detected abnormal behaviors may be compared to components and behaviors indicated in respective CVEs in order to determine a type of vulnerability or exposure which may be subject to exploitation.

At S580, one or more mitigation actions are performed in order to mitigate the detected cyber threat. The mitigation actions may include, but are not limited to, deploying or utilizing security controls in order to cause one or more cybersecurity tools to act with respect to an asset. The mitigation actions to be performed may be determined based on a type of vulnerability which may be exploited for the asset (e.g., a type of vulnerability indicated as a CVE among the outputs of the tools).

Figure 6:
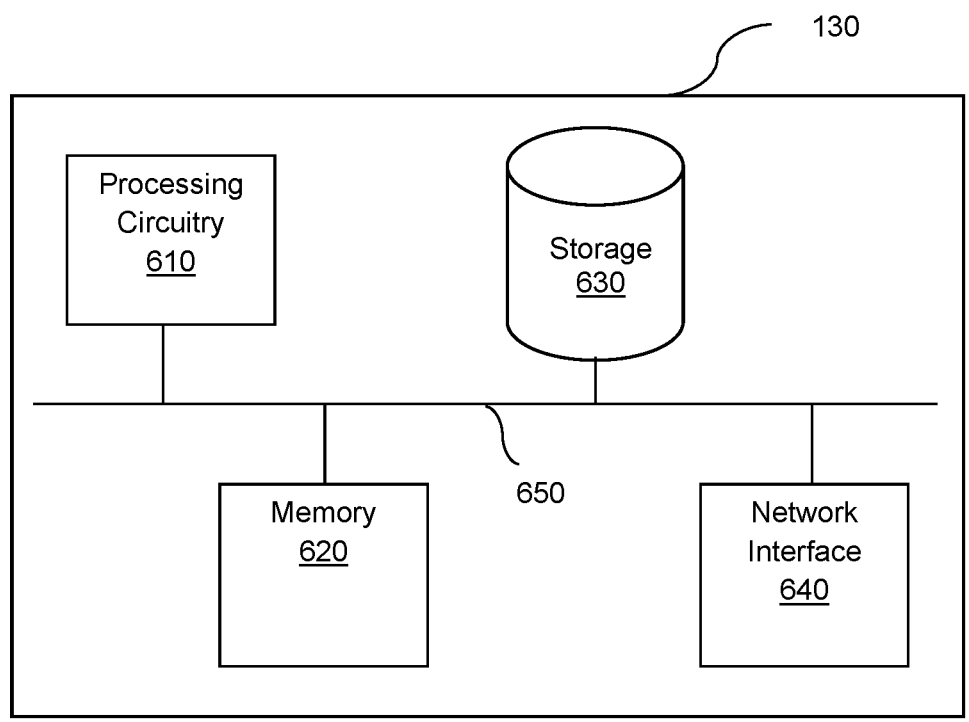
FIG. 6 is a schematic diagram of a runtime inspector according to an embodiment.

FIG. 6 is an example schematic diagram of a runtime inspector 130 according to an embodiment. The runtime inspector 130 includes a processing circuitry 610 coupled to a memory 620, a storage 630, and a network interface 640. In an embodiment, the components of the runtime inspector 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the runtime inspector 130 to communicate with, for example, the computing environments 120 and the agents 125 deployed therein.

It should be understood that the embodiments described herein are not limited to the specific architecture illustrated in FIG. 6, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for cybersecurity analysis, comprising:
   identifying a first set of paths to a first asset, wherein each path of the first set of paths is defined with respect to at least one first application programming interface (API) used in order to access the first asset, the first set of paths including a first path which allows for uploading inspection code, a second path which allows for running the inspection code, and a third path which allows for obtaining results of running the inspection code; wherein the first set of paths is selected such that at least a portion of the at least one first API is shared with at least a portion of at least one second API of a second set of paths to a second asset, wherein the first set of paths is selected based further on at least one request processing attribute of the at least one first API;
   uploading the inspection code via the first path, wherein the inspection code is configured to analyze runtime behavior with respect to the first asset when executed;
   running the inspection code via the second path;
   obtaining results of running the inspection code via the third path, wherein the results of running the inspection code include outputs of the inspection code;
   analyzing the results of running the inspection code;
   determining a code flow, wherein the code flow includes use of a first function of a library, wherein the first function is an exported function;
   identifying a use of the exported function in a memory to which the library is loaded; and
   correlating the use of the first function to at least one second function based on the determined code flow.

2. The method of claim 1, wherein analyzing the results of running the inspection code includes determining at least one path of exploitation of the first asset based on the results of running the inspection code, further comprising:
   determining an exploitability of the first asset based on the at least one path of exploitation of the first asset.

3. The method of claim 1, further comprising:
   correlating instances of the first asset represented in data from a plurality of data sources, wherein the data from the plurality of data sources includes the results of running the inspection code.

4. The method of claim 3, wherein the inspection code includes instructions that, when executed by a processing circuitry, configure the processing circuitry to cause a unique identifier to be attached to the instances of the first asset represented in the data from the plurality of data sources, further comprising:
   identifying the instances of the first asset to be correlated based on the unique identifier as attached to the instances of the first asset represented in the data from the plurality of data sources.

5. The method of claim 1, further comprising:
   determining effects of at least one security control on at least one potential exploitation for the first asset, wherein each security control is configured to perform at least one of detecting vulnerabilities and mitigating vulnerabilities.

6. The method of claim 1, wherein identifying the use of the first function further comprises:
   identifying at least one value indicating use of the first functions in a global offset tables stored in the memory to which the library is loaded.

7. The method of claim 1, further comprising:
   correlating at least one first library hash among the results of running the inspection code with at least one second library hash, wherein the at least one second library hash corresponds to at least one predetermined library;
   correlating at least one third library hash with the at least one second library hash, wherein the at least one third library hash is included among outputs of at least one computing environment management tool; and
   detecting at least one cyber threat based on the outputs of the at least one computing environment management tool and the correlation between the at least one third library hash with the at least one second library hash.

8. The method of claim 1, wherein the at least one second API is configured to access at least one library to be used by the inspection code uploaded via the first path.

9. The method of claim 1, wherein the first set of paths is selected based on a number of actions which can be performed on different assets concurrently via the first set of paths.

10. The method of claim 9, wherein the number of actions which can be performed on different assets concurrently via the first set of paths is defined with respect to at least one of: a limit on concurrent actions for each the at least one first API, speed of at least one system on which the at least one first API is used, and latency of the at least one system on which the at least one first API is used.

11. The method of claim 1, further comprising:
performing at least one mitigation action based on the results of the analysis.

12. A non-transitory computer readable medium having stored thereon instructions for causing a processing circuitry to execute a process, the process comprising:
identifying a first set of paths to a first asset, wherein each path of the first set of paths is defined with respect to at least one first application programming interface (API) used in order to access the first asset, the first set of paths including a first path which allows for uploading inspection code, a second path which allows for running the inspection code, and a third path which allows for obtaining results of running the inspection code; wherein the first set of paths is selected such that at least a portion of the at least one first API is shared with at least a portion of at least one second API of a second set of paths to a second asset, wherein the first set of paths is selected based further on at least one request processing attribute of the at least one first API;
uploading the inspection code via the first path, wherein the inspection code is configured to analyze runtime behavior with respect to the first asset when executed;
running the inspection code via the second path;
obtaining results of running the inspection code via the third path, wherein the results of running the inspection code include outputs of the inspection code; and
analyzing the results of running the inspection code;
determining a code flow, wherein the code flow includes use of a first function of a library, wherein the first function is an exported function;
identifying a use of the exported function in a memory to which the library is loaded; and
correlating the use of the first function to at least one second function based on the determined code flow.

13. A system for cybersecurity analysis, comprising:
a processing circuitry; and
a memory, the memory containing instructions that, when executed by the processing circuitry, configure the system to:
identify a first set of paths to a first asset, wherein each path of the first set of paths is defined with respect to at least one first application programming interface (API) used in order to access the first asset, the first set of paths including a first path which allows for uploading inspection code, a second path which allows for running the inspection code, and a third path which allows for obtaining results of running the inspection code; wherein the first set of paths is selected such that at least a portion of the at least one first API is shared with at least a portion of at least one second API of a second set of paths to a second asset, wherein the first set of paths is selected based further on at least one request processing attribute of the at least one first API;
upload the inspection code via the first path, wherein the inspection code is configured to analyze runtime behavior with respect to the first asset when executed;
run the inspection code via the second path;
obtain results of running the inspection code via the third path, wherein the results of running the inspection code include outputs of the inspection code; and
analyze the results of running the inspection code;
determine a code flow, wherein the code flow includes use of a first function of a library, wherein the first function is an exported function;
identify a use of the exported function in a memory to which the library is loaded; and
correlate the use of the first function to at least one second function based on the determined code flow.

14. The system of claim 13, wherein analyzing the results of running the inspection code includes determining at least one path of exploitation of the first asset based on the results of running the inspection code, wherein the system is further configured to:
determine an exploitability of the first asset based on the at least one path of exploitation of the first asset.

15. The system of claim 13, wherein the system is further configured to:
correlate instances of the first asset represented in data from a plurality of data sources, wherein the data from the plurality of data sources includes the results of running the inspection code.

16. The system of claim 15, wherein the inspection code includes instructions that, when executed by a processing circuitry, configure the processing circuitry to cause a unique identifier to be attached to the instances of the first asset represented in the data from the plurality of data sources, wherein the system is further configured to:
identify the instances of the first asset to be correlated based on the unique identifier as attached to the instances of the first asset represented in the data from the plurality of data sources.

17. The system of claim 13, wherein the system is further configured to:
determine effects of at least one security control on at least one potential exploitation for the first asset, wherein each security control is configured to perform at least one of detecting vulnerabilities and mitigating vulnerabilities.

18. The system of claim 13, wherein the system is further configured to:
identify at least one value indicating use of the first functions in a global offset tables stored in the memory to which the library is loaded.

19. The system of claim 13, wherein the system is further configured to:
correlate at least one first library hash among the results of running the inspection code with at least one second library hash, wherein the at least one second library hash corresponds to at least one predetermined library;
correlate at least one third library hash with the at least one second library hash, wherein the at least one third library hash is included among outputs of at least one computing environment management tool; and
detect at least one cyber threat based on the outputs of the at least one computing environment management tool and the correlation between the at least one third library hash with the at least one second library hash.

20. The system of claim 13, wherein the at least one second API is configured to access at least one library to be used by the inspection code uploaded via the first path.

21. The system of claim 13, wherein the first set of paths is selected based on a number of actions which can be performed on different assets concurrently via the first set of paths.

22. The system of claim 21, wherein the number of actions which can be performed on different assets concurrently via the first set of paths is defined with respect to at least one of: a limit on concurrent actions for each the at least one first API, speed of at least one system on which the at least one first API is used, and latency of the at least one system on which the at least one first API is used.

23. The system of claim 13, wherein the system is further configured to: perform at least one mitigation action based on the results of the analysis.

24. A method for cybersecurity analysis, comprising:
identifying a first set of paths to a first asset, wherein each path of the first set of paths is defined with respect to at least one first application programming interface (API) used in order to access the first asset, the first set of paths including a first path which allows for uploading inspection code, a second path which allows for running the inspection code, and a third path which allows for obtaining results of running the inspection code; wherein the first set of paths is selected such that at least a portion of the at least one first API is shared with at least a portion of at least one second API of a second set of paths to a second asset, wherein the first set of paths is selected based further on at least one request processing attribute of the at least one first API;
uploading the inspection code via the first path, wherein the inspection code is configured to analyze runtime behavior with respect to the first asset when executed;
running the inspection code via the second path;
obtaining results of running the inspection code via the third path, wherein the results of running the inspection code include outputs of the inspection code;
analyzing the results of running the inspection code;
correlating at least one first library hash among the results of running the inspection code with at least one second library hash, wherein the at least one second library hash corresponds to at least one predetermined library;
correlating at least one third library hash with the at least one second library hash, wherein the at least one third library hash is included among outputs of at least one computing environment management tool; and
detecting at least one cyber threat based on the outputs of the at least one computing environment management tool and the correlation between the at least one third library hash with the at least one second library hash.

25. A non-transitory computer readable medium having stored thereon instructions for causing a processing circuitry to execute a process, the process comprising:
identifying a first set of paths to a first asset, wherein each path of the first set of paths is defined with respect to at least one first application programming interface (API) used in order to access the first asset, the first set of paths including a first path which allows for uploading inspection code, a second path which allows for running the inspection code, and a third path which allows for obtaining results of running the inspection code; wherein the first set of paths is selected such that at least a portion of the at least one first API is shared with at least a portion of at least one second API of a second set of paths to a second asset, wherein the first set of paths is selected based further on at least one request processing attribute of the at least one first API;
uploading the inspection code via the first path, wherein the inspection code is configured to analyze runtime behavior with respect to the first asset when executed;
running the inspection code via the second path;
obtaining results of running the inspection code via the third path, wherein the results of running the inspection code include outputs of the inspection code;
analyzing the results of running the inspection code;
correlating at least one first library hash among the results of running the inspection code with at least one second library hash, wherein the at least one second library hash corresponds to at least one predetermined library;
correlating at least one third library hash with the at least one second library hash, wherein the at least one third library hash is included among outputs of at least one computing environment management tool; and
detecting at least one cyber threat based on the outputs of the at least one computing environment management tool and the correlation between the at least one third library hash with the at least one second library hash.

26. A system for cybersecurity analysis, comprising:
a processing circuitry; and
a memory, the memory containing instructions that, when executed by the processing circuitry, configure the system to:
identify a first set of paths to a first asset, wherein each path of the first set of paths is defined with respect to at least one first application programming interface (API) used in order to access the first asset, the first set of paths including a first path which allows for uploading inspection code, a second path which allows for running the inspection code, and a third path which allows for obtaining results of running the inspection code; wherein the first set of paths is selected such that at least a portion of the at least one first API is shared with at least a portion of at least one second API of a second set of paths to a second asset, wherein the first set of paths is selected based further on at least one request processing attribute of the at least one first API;
upload the inspection code via the first path, wherein the inspection code is configured to analyze runtime behavior with respect to the first asset when executed;
run the inspection code via the second path;
obtain results of running the inspection code via the third path, wherein the results of running the inspection code include outputs of the inspection code;
analyze the results of running the inspection code;
correlate at least one first library hash among the results of running the inspection code with at least one second library hash, wherein the at least one second library hash corresponds to at least one predetermined library;
correlate at least one third library hash with the at least one second library hash, wherein the at least one third library hash is included among outputs of at least one computing environment management tool; and
detect at least one cyber threat based on the outputs of the at least one computing environment management tool and the correlation between the at least one third library hash with the at least one second library hash.

* * * * *